US011823153B1

(12) United States Patent
Scott et al.

(10) Patent No.: US 11,823,153 B1
(45) Date of Patent: **\*Nov. 21, 2023**

(54) CASH ADVANCE PAYMENT DEFERRALS

(71) Applicant: Block, Inc., San Francisco, CA (US)

(72) Inventors: John Bryan Scott, San Francisco, CA (US); Brian Boates, San Francisco, CA (US); Adam Jeremy Fern, San Francisco, CA (US); Andrew Kimball, Moraga, CA (US)

(73) Assignee: BLOCK, INC., Oakland, CA (US)

( * ) Notice: Subject to any disclaimer, the term of this patent is extended or adjusted under 35 U.S.C. 154(b) by 116 days.

This patent is subject to a terminal disclaimer.

(21) Appl. No.: 17/321,637

(22) Filed: May 17, 2021

Related U.S. Application Data (63) Continuation of application No. 16/840,563, filed on Apr. 6, 2020, now Pat. No. 11,010,740, which is a
(Continued)

(51) Int. Cl.
| | | |
|---|---|---|
| *G06Q 40/00* | (2023.01) | |
| *G06Q 20/20* | (2012.01) | |
| *G06Q 20/14* | (2012.01) | |
| *G06Q 40/02* | (2023.01) | |
| *G06Q 20/10* | (2012.01) | |
| *G06Q 20/40* | (2012.01) | |
| *G06Q 40/03* | (2023.01) | |

(52) U.S. Cl.
CPC ......... *G06Q 20/202* (2013.01); *G06Q 20/102* (2013.01); *G06Q 20/145* (2013.01); *G06Q 20/405* (2013.01); *G06Q 40/03* (2023.01)

(58) Field of Classification Search
CPC ... G06Q 20/202; G06Q 20/145; G06Q 40/025
See application file for complete search history.

(56) References Cited

U.S. PATENT DOCUMENTS

| | | | |
|---|---|---|---|
| 10,019,698 B1 * | 7/2018 | Scott | .................... G06Q 20/145 |
| 10,628,816 B1 | 4/2020 | Scott et al. | |

(Continued)

OTHER PUBLICATIONS

Non-Final Office Action dated Aug. 22, 2019, for U.S. Appl. No. 15/911,221, of Scott, J.B., et al., filed Mar. 5, 2018.
(Continued)

*Primary Examiner* — Talia F Crawley
(74) *Attorney, Agent, or Firm* — MATTINGLY & MALUR, PC (57) ABSTRACT

In some examples, a financial system receives, from a plurality of computing devices associated with a plurality of users, respectively, transaction data of transactions performed by the plurality of users. The financial system may provide, based at least on the transaction data, financing to an account of a first user, the financing including repayment terms for repayment of the financing. The financial system may receive, from one or more services, one or more signals related to a business of the first user. Further, the financial system may determine, based on the received one or more signals related to the business of the first user, updated repayment terms for repayment of the financing from the first user. In addition, the financial system may apply the updated repayment terms for repayment of the financing.

20 Claims, 6 Drawing Sheets

Related U.S. Application Data continuation of application No. 15/911,221, filed on Mar. 5, 2018, now Pat. No. 10,628,816, which is a continuation of application No. 14/622,605, filed on Feb. 13, 2015, now Pat. No. 10,019,698.

(56) References Cited

U.S. PATENT DOCUMENTS

| | | | |
|---|---|---|---|
| 11,010,740 B1 | 5/2021 | Scott et al. | |
| 2008/0052229 A1* | 2/2008 | Sheinker | G06Q 30/06 |
| | | | 705/40 |
| 2010/0228651 A1* | 9/2010 | Becerra | G06Q 40/12 |
| | | | 705/30 |
| 2011/0251870 A1* | 10/2011 | Tavares | G06Q 30/0201 |
| | | | 705/7.29 |
| 2012/0089436 A1* | 4/2012 | Tavares | G06Q 30/0201 |
| | | | 705/7.29 |
| 2012/0233090 A1* | 9/2012 | Tavares | G06Q 40/06 |
| | | | 705/36 R |

OTHER PUBLICATIONS

Notice of Allowance dated Dec. 23, 2019, for U.S. Appl. No. 15/911,221, of Scott, J.B., et al., filed Mar. 5, 2018.
Non-Final Office Action dated Oct. 15, 2020, for U.S. Appl. No. 16/840,563, of Scott, J. B., et al., filed Apr. 6, 2020.
Notice of Allowance dated Jan. 22, 2021, for U.S. Appl. No. 16/840,563, of Scott, J. B., et al., filed Apr. 6, 2020.

* cited by examiner

CASH ADVANCE PAYMENT DEFERRALS

CROSS-REFERENCES TO RELATED APPLICATIONS

This application is a continuation of, and claims priority to, U.S. patent application Ser. No. 16/840,563, filed Apr. 6, 2020, issued as U.S. Pat. No. 11,010,740, which is a continuation of, and claims priority to, U.S. patent application Ser. No. 15/911,221, filed Mar. 5, 2018, issued as U.S. Pat. No. 10,628,816, which is a continuation of, and claims priority to, U.S. patent application Ser. No. 14/622,605, filed Feb. 13, 2015, issued as U.S. Pat. No. 10,019,698, all of which are incorporated by reference herein.

BACKGROUND

Individuals and businesses can approach financial institutions, e.g., banks, to request funds for various purposes. When requesting funds, an individual will typically fill out an application that provides the bank with the individual's personal and financial information. The bank will then evaluate the individual's application to make a decision on whether to approve the funds.

Typically, the financial institution requires repayment of the funds through periodic payments over a term of repayment. This can be problematic since the individual or business may not have consistent income throughout the term of repayment and therefore it may be difficult to repay the funds in a timely manner.

BRIEF DESCRIPTION OF THE DRAWINGS

The techniques described herein are illustrated by way of example, and not by way of limitation, in the figures of the accompanying drawings, in which like reference numerals are used to refer to similar elements.

The figures depict various embodiments of the techniques described herein for purposes of illustration only. It should be readily recognized from the following discussion that alternative embodiments of the structures and methods illustrated herein may be employed without departing from the principles of the techniques described herein.

DETAILED DESCRIPTION

Example embodiments described herein include techniques and hardware arrangements for offering and managing repayment of a cash advance to merchants using a mobile point-of-sale terminal and automatically determining a payment deferral for the merchant. More specifically, the techniques introduced herein include providing financing, e.g., cash advances, loans, or the like, to a merchant having an account with a payment processing service provider who operates the payment processing system and managing repayment of the financing. It will be recognized that the techniques discussed herein can apply to various financing methods, such as cash advances and loans, although one or the other may be used for descriptive purposes in the examples below. The techniques disclosed herein, whether discussed in the examples as cash advance techniques or loan techniques, can be practiced with equal applicability as a cash advance or loan. The payment processing system is configured to process a plurality of financial transactions between the merchant and buyers via a mobile point-of-sale (POS) terminal and receive repayment of the financing from the merchant by withholding a portion of funds from the plurality of financial transactions processed for the merchant. The payment processing system withholds the portion of funds according to repayment terms for the financing.

Additionally, the techniques include, receiving signals from other products provided to the merchant by the payment processing service provider. The payment processing system uses the signals from the other products and merchant account information from the payment processing system to determine a payment deferral for the merchant where the payment processing system refrains from taking repayment from the plurality of financial transactions processed for the merchant by the payment processing system. The payment processing system may transmit a notification of the payment deferral to the merchant via the mobile POS terminal. In response, the payment processing system receives, via the mobile POS terminal, acceptance of the payment deferral by the merchant. Once agreed to, the payment processing system refrains from taking repayment of the cash advance from the plurality of financial transactions processed for the merchant by the payment processing system for the duration of the payment deferral.

Figure 1:
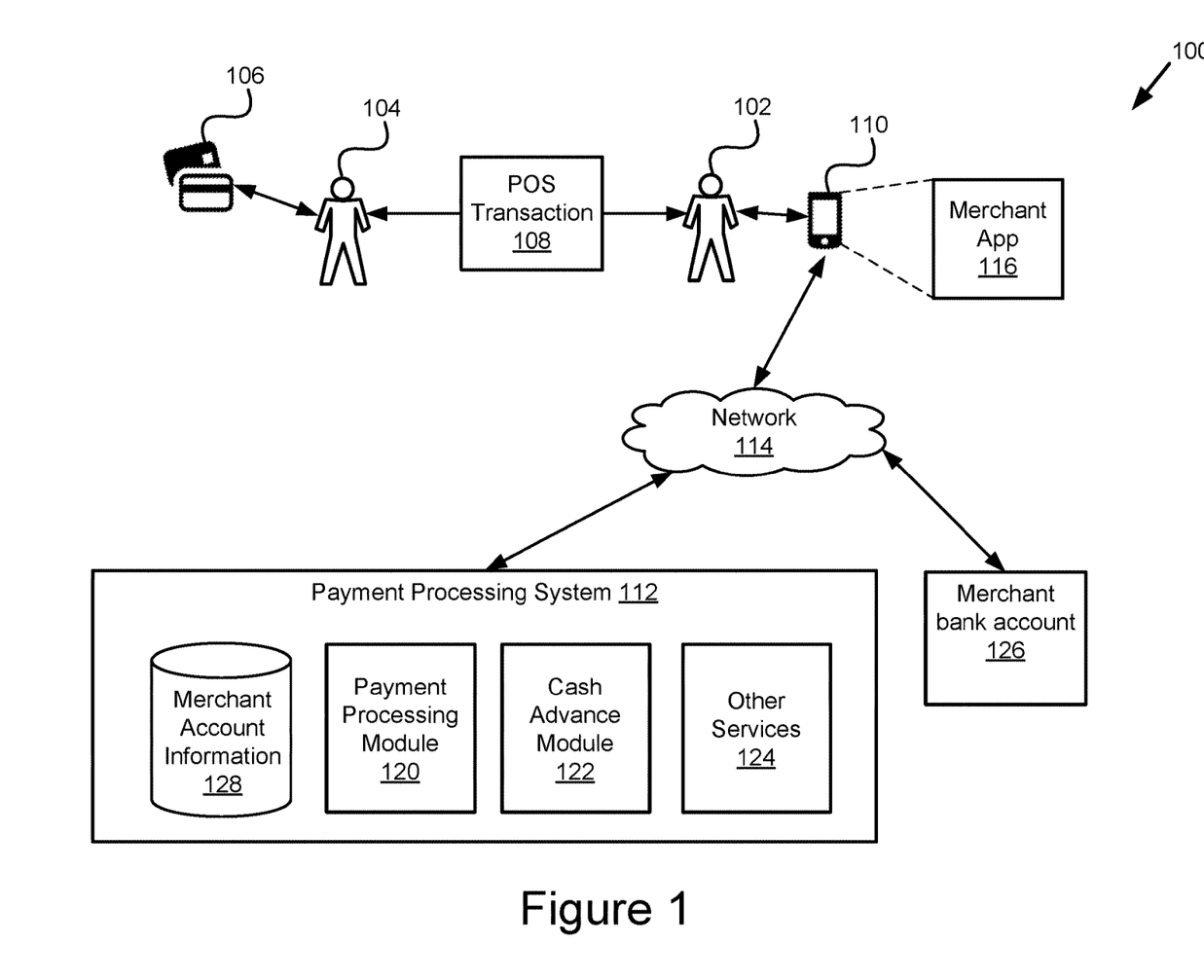
FIG. 1 illustrates an example architecture of a payment processing system for offering and managing repayment of a cash advance to merchants.

FIG. 1 illustrates an example architecture of a system 100 for enabling transactions between merchants 102 and buyers 104. In the example of FIG. 1, a buyer 104 may use any of a variety of payment cards 106 when participating in a point-of-sale (POS) transaction with the merchant 102. In some embodiments, the payment cards may include one or more magnetic stripes for providing payment card and buyer information when swiped in a card reader. In other embodiments, other types of payment cards or methods may be used, for example smart cards having a built in integrated circuit including a memory chip or a radio frequency identification tag, a mobile communication device including a near field communication chip, and the like.

The system 100 in the example of FIG. 1 illustrates a merchant device 110 associated with the merchant 102 that participates in the payment processing service provided by a service provider. The merchant device 110, as discussed elsewhere herein, may be any appropriate computing device configured to allow the merchant 102 to access the payment processing system 112 over the network 114. In some embodiments, the merchant device 110 may be a mobile computing device such as a smartphone or a tablet. In other embodiments, the merchant device 110 may be a desktop computer, a laptop computer, a netbook, or other computing device.

In some embodiments, the merchant device 110 may include an instance of a merchant application 116 executed on the merchant device 110. The merchant application 116 may provide POS functionality to enable the merchant 102 to accept payments at a POS location using the merchant device 110. The merchant application running on the merchant device 110 may send transaction information via network 114 (e.g., the internet) to the payment processor system 112, e.g., as the transaction is being conducted at the POS location. The transaction information may include information regarding the time, place, and the amount of each respective transaction, information related to the item acquired, payment card information, as well as additional information, such as buyer information.

The payment processing system 112 enables a service provider to provide a payment service in which merchants 102 are able to conduct POS transactions 108 with buyers, such as for selling services and/or products to the buyers. The payment processing system 112 includes a payment processing module 120, cash advance module 122, other services module 124, and merchant account information 128. The payment processing module 120 receives transaction information for processing payments made through a merchant application 116 of a merchant device 110. For example, the payment processing module 120 may receive transaction information, including payment card information, from the merchant device 110 and verify that the payment card can be used to pay for the transaction, such as by contacting a card clearinghouse of a payment card network.

The cash advance module 122 includes software and/or logic for providing a cash advance to a merchant 102 based on merchant account information. The cash advance module 122 queries the merchant account information database 128 to retrieve attributes of the merchant account that may be used to determine whether the merchant qualifies for a cash advance. For example, merchant account attributes may include the number of payments accepted by the merchant, the number of payment card swipes through a payment card reader, a payment card reader model, merchant bank account information, held funds associated with the merchant account, status of account set up, and the like.

Using the merchant account attributes, the cash advance module 122 determines an amount for the cash advance for the merchant 102. Additionally, the cash advance module 122 may determine a fee for the cash advance (e.g., a percentage of the cash advance or a fixed fee), a rate of repayment for the cash advance and the fee, a duration of repayment of the cash advance, and other terms of the cash advance. In some embodiments, the cash advance module 122 may determine that the merchant 102 qualifies up to a maximum amount of cash advance. In such embodiments, the merchant can request an amount of cash advance that is the same or less than the maximum amount of cash advance. In some embodiments, the merchant 102 may request an amount of cash advance that is higher than the amount of cash advance that the merchant 102 was pre-qualified to receive based on the merchant account context. The merchant may be provided the cash advance through an electronic deposit made by the payment system in a merchant bank account 126. In some other embodiments, the merchant 102 may be provided with a financial payment card having a pre-set spending limit in the amount of the cash advance.

In one embodiment, to collect repayment from the merchant for the cash advance amount and the fee, the cash advance module 122 may collect the total amount of cash advance and the fee from the merchant by withholding a portion of the amounts collected by the merchant from future financial transactions conducted through the payment processing system (e.g., POS transaction system 108). In some embodiments, the payment processing system 112 automatically deducts a pre-determined percentage from a total amount collected by the merchant for financial transactions conducted by the merchant over a certain time period (e.g., hourly, daily, weekly, bi-weekly, monthly or yearly).

The cash advance module 122 further includes software and/or logic for analyzing a plurality of signals generated from the other services 124 and the merchant account information database 128 to determine a payment deferral for the merchant. The process for determining payment deferral is described in more detail below with reference to FIG. 3. In one embodiment, in addition to or as an alternative to the cash advance module 122 automatically determining a payment deferral for the merchant, the merchant may request a payment deferral, for example, through the merchant device 110. In response to the request, the cash advance module 122 may determine eligibility of the merchant for a payment deferral using one or more of the plurality of signals generated from the other services 124 and the merchant account information database 128.

The merchant account information database 128 securely stores merchant account information. In one embodiment, the merchant account information database 128 includes merchant name, contact information (e.g., telephone numbers, email address, the merchant's address and one or more financial accounts to which funds collected from buyers will be deposited), a transaction history for the merchant, and the like. Further, the merchant information database 128 may include a merchant profile created for each merchant.

The other services 124 include software and/or logic for providing other products and/or services to the merchant. The other products and/or services may include, for example, an invoicing service, an inventory service, a payroll service, an appointment service, a feedback service, an analytics service, a pickup/delivery service, or the like. In some embodiments, the payment processing system 112 provides the cash advance module 122 with signals from the other services 124 for the cash advance module 122 to use in determining a payment deferral for the merchant.

For example, the payment processing system 112 may provide the cash advance module 122 with a signal from an invoicing service indicating that a large order fulfilled by the merchant is to be paid by the recipient over an extended time period. Based on this signal, the cash advance module may determine that the merchant's cash flow will be lower than expected over the period and grant a cash advance deferral for the period. In another example, the payment processing system 112 may provide the cash advance module 122 with a signal from an inventory service indicating that a merchant's inventory is running low and, based on that signal, the cash advance module may determine that the merchant will have low sales and grant a cash advance payment deferral to the merchant. Similarly, the payment processing system 112 may provide the cash advance module 122 with a signal from the payroll service that indicates that a majority of the merchant's employees are taking time off, or are given a holiday, at a particular time. The cash advance module 122 can use that signal to grant a cash advance payment deferral for that particular time since the merchant may not have as many transactions processed during that time.

Further, the payment processing system 112 may provide the cash advance module 122 with a signal from the appointment service that shows that the merchant has very few appointments scheduled with clients over a future time period. Based on that signal, the cash advance module 122 may determine that the merchant will have lower than expected sales during the future time period and grant a cash advance payment deferral for the future time period. The payment processing system 112 may also provide the cash advance module 122 with a signal from the pickup/delivery service that indicates a low number of orders. Like the above examples, the cash advance module 122 may use this signal to determine that the merchant may have low cash flow due to the low number of orders and grant a cash advance payment deferral to the merchant. Additionally, the payment processing system 112 may provide the cash advance module 122 with a signal from the feedback service that shows that the merchant has generally low feedback scores or has feedback scores that have been trending downward over a past time period. Based on that signal, the cash advance module 122 may determine that the merchant will have lower than expected sales during a future time period and grant a cash advance payment deferral for the future time period Alternatively, or in addition to the above examples, the payment processing system 112 may provide the cash advance module 122 with a signal from the analytics service. The analytics service may provide advanced analytics on a merchant past sales, one or more of the other signals discussed herein, and other information to determine future trends, and the like. The cash advance module 122 may use the signal from the analytics service to determine whether and when to grant the merchant a cash advance payment deferral.

Once the cash advance module 122 has determined a payment deferral for the merchant, the cash advance module 122 can instruct the payment processing module 120 to refrain from withholding a portion of funds from the plurality of financial transactions processed for the merchant for the duration of the payment deferral.

Figure 2:
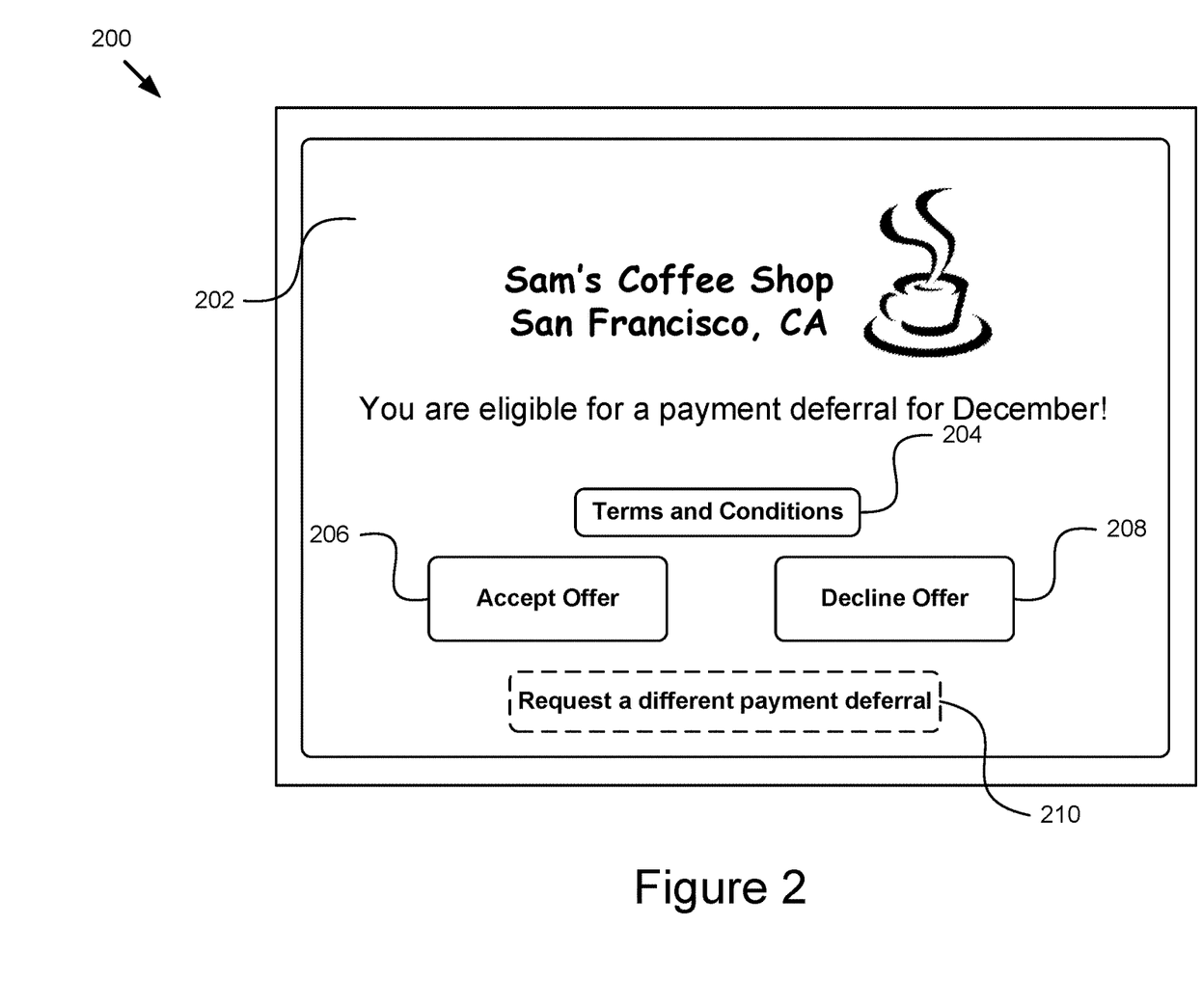
FIG. 2 illustrates an example graphic representation of a merchant user interface for offering a payment deferral to the merchant.

FIG. 2 illustrates an example graphic representation of a user interface 202 for offering a cash advance payment deferral to a merchant. The interface 202 can be displayed on a display screen of a computing device (e.g., merchant device 110) that is being operated by a merchant ("Sam's Coffee Shop"). The computing device presents the interface 202 to the merchant through an application, e.g., a web browser or a merchant application, that is running on the computing device. For example, the interface 202 may be accessible to the merchant over the Internet and through a secure Uniform Resource Locator (URL). Similarly, the interface 202 may be accessible to the merchant through a software application, e.g., the merchant application 116 that is running on the merchant device 110.

As shown in the example of FIG. 2, the interface 202 displays information generated by the payment processing system 112 regarding a payment deferral for the merchant. As described above, the payment processing system 112 is configured to determine whether the merchant qualifies for a payment deferral by evaluating various signals from the merchant account information 128 and signals from the other services 124, as described herein. Once a determination is made that the merchant qualifies for a payment deferral, the details of the payment deferral may be displayed to the merchant, for example, via the merchant application 116 on the merchant device 110. After receiving notification of the offer, the merchant can interact with the computing device, e.g., the merchant device 110, to access the interface 202 and learn more about the offer details.

As depicted in the example of FIG. 2, the interface 202 provides the merchant with information about the payment deferral. In some embodiments, this information includes a duration of payment deferral that the merchant is qualified to receive. This duration can be determined based in part on evaluating the merchant's previous financial transactions that were processed through the payment system and signals from the other services provided by the payment processing service provider. For example, the cash advance module 122 may determine that the merchant qualifies for a payment deferral of up to one month. This information can be presented to the merchant through the interface 202. In some embodiments, the merchant can select an option to accept the offer of the payment holiday 206 or select an option to decline the offer of the payment holiday 208. In one embodiment, the merchant is not given an option to accept of decline the payment deferral and the cash advance module 122 automatically implements the payment deferral. However, in one embodiment, the cash advance module 122 may notify the merchant through the interface 202 that a payment deferral has been implemented.

The merchant may decide that a payment deferral of a different duration than the payment deferral being offered is desired. In some embodiments, the interface 202 may include an option 210 to request a payment deferral of a different duration. In one embodiment, upon selecting the option 210 to request a payment deferral of a different duration, the merchant may be allowed to input the desired duration of payment deferral. The payment cash advance module 122 can provide an adjusted duration granted for requested payment deferral.

Figure 3:
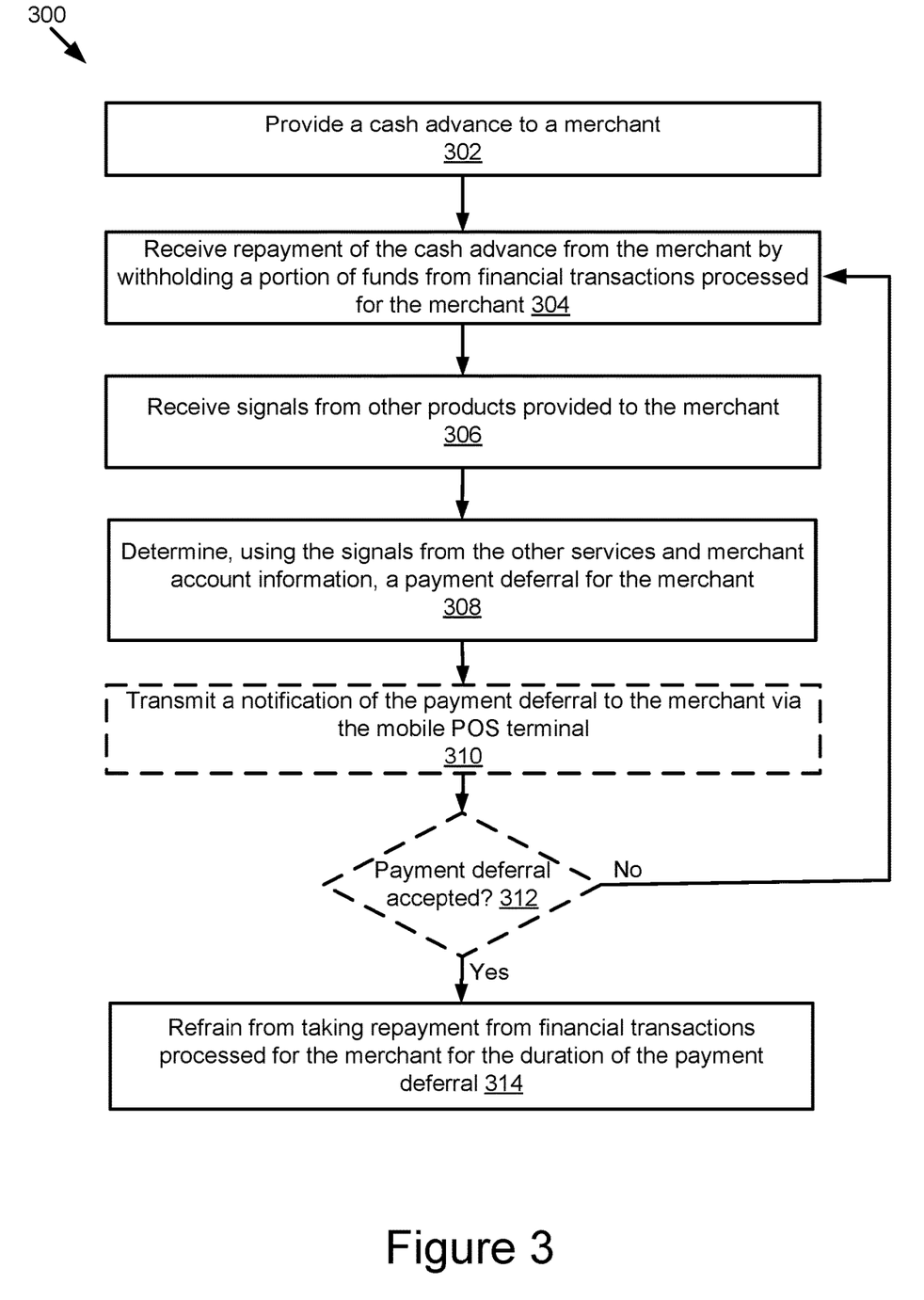
FIG. 3 is a flow diagram of an example process for determining a payment deferral for merchants.

The process described in FIG. 3 is illustrated as a collection of blocks in a logical flow diagram, which represents a sequence of operations, some or all of which can be implemented in hardware, software, or a combination thereof. The order in which the blocks are described should not be construed as a limitation. Any number of the described blocks can be combined in any order and/or in parallel to implement the processes, or alternative processes, and not all of the blocks need be executed. For ease of description, the processes are described with reference to the environments, architectures and systems described in the examples herein, although the processes may be implemented in a wide variety of other environments, architectures and systems.

FIG. 3 is a flow diagram of an example process 300 for determining a payment deferral for a merchant. At 302, the cash advance module 122 provides a cash advance to a merchant. In one embodiment, the cash advance module 122 analyzes previous financial transactions of the merchant to determine whether the merchant qualifies for a cash advance. For example, as described elsewhere herein, the cash advance module 122 may analyze the payments processed by the payment processing system 112 for the merchant from the current year or previous years to determine whether the merchant is eligible for a cash advance.

At 304, the cash advance module 122 receives repayment of the cash advance from the merchant by withholding a portion of funds from POS transactions processed for the merchant by the payment processing system 112. In one embodiment, the cash advance module 122 is configured to instruct the payment processing module 120 to withhold a percentage of each POS transaction processed for the merchant for repayment of the cash advance and deposit the remaining amount of each POS transaction in the merchant's bank account. For example, when the merchant conducts a POS transaction through the payment processing system 112, the payment processing module 120 can withhold 10 percent from the amount collected by the merchant from the POS transaction. In some embodiments, the payment processing module 120 automatically deducts 10 percent from a total amount collected by the merchant for POS transactions conducted by the merchant over a certain time period, e.g., hourly, daily, weekly, bi-weekly, monthly, or yearly. In some embodiments, there is no set time period for repayment of the cash advance and fee. However, a time period for repayment may be specified in the repayment terms. Naturally, once the cash advance and fee have been repaid, the payment processing module 120 no longer withholds a portion of the merchant's earnings from POS transactions.

At 306, the cash module 122 receives signals from other products provided to the merchant 102 from other services 124 provided to the merchant by the payment processing service provider. In various embodiments, an invoicing service, an inventory service, a payroll service, an appointment service, a feedback service, an analytics service, a pickup/delivery service, or the like. As described above, the payment processing system 112 may provide the cash advance module 122 with a signal from the other services 124 regarding a merchant's inventory and, based on that signal, the cash advance module 122 may determine that the merchant will have low sales and grant a cash advance payment deferral to the merchant. Similarly, the payment processing system 112 may provide the cash advance module 122 with a signal from the payroll service that indicates that a majority of the merchant's employees are taking time off, or are given a holiday, at a particular time. The cash advance module 122 can use that signal to grant a cash advance payment deferral for that particular time since the merchant may not have as many POS transactions processed during that time.

In some embodiments, the cash advance module 122 may receive signals including historical performance of other merchants similar to the merchant being considered for a cash advance payment deferral. These types of signals can be used to determine whether to grant a payment deferral to a merchant who has a sparse transaction history or to a broad range of merchants. For example, the cash advance module 122 may determine that merchants of a particular type (e.g., fireworks salesman in the United States) generally have a slow sales period during early winter months and may grant a payment deferral to all such merchants for that period.

At 308, the cash advance module 122 determines, using the signals from the other services 124 and the merchant account information, a payment deferral for the merchant where the payment processing system refrains from taking repayment from the plurality of POS transactions processed for the merchant. In one embodiment, the cash advance module 122 may determine a payment deferral on receiving signals from the other services 124 indicating low inventory levels. In another embodiment, the cash advance module 122 may determine a payment deferral on receiving signals from the other services 124 indicating that there will likely be fewer sales since a large number of employees of the merchant 102 are taking vacation. In some embodiments, the cash advance module 122 may determine a payment deferral based on the historical performance of the merchant 102 and the performance of other merchants in a similar business. In some embodiments, instead of refraining to withhold a portion of the amount of each POS transaction processed for the merchant, the cash advance module 122 may determine to withhold a lower percentage of funds from each POS transaction processed for the merchant 102 during the duration of the payment deferral. Similarly, the cash advance module 122 may determine to cap withholding of funds for a specified period of time (e.g., the cash advance module 122 would withhold, at most, the capped amount regardless of the total transactions processed). In another embodiment, the cash advance module 122 may determine to withhold funds only after a threshold amount of transactions have been processed and withhold funds for repayment only on transactions above that threshold (e.g., the cash advance module 122 only withholds funds for repayment of the cash advance after the first $1,000 in sales have been processed).

At 310, the cash advance module 122 optionally transmits a notification of the payment deferral to the merchant 102 via the merchant device 110. For example, as described above with reference to FIG. 2, the payment processing system 112 may transmit a notification of the payment deferral to a merchant application 116 running on merchant device 110. The merchant application 116 may then display the notification to the merchant for acceptance. As described elsewhere herein, in some embodiments, the cash advance module 122 implements the payment deferral without notifying the merchant.

At 312, the cash advance module 122 determines whether the payment deferral was accepted by the merchant 102. In one embodiment, the merchant 102 may accept the offer for payment deferral. In some embodiments, the merchant 102 may decline the offer for payment deferral and continue repaying the cash advance. In another embodiment, the merchant 102 may request a different payment deferral.

At 314, the payment processing module 120 refrains from taking repayment from POS transactions processed for the merchant by the payment processing system for the duration of the payment deferral. In some embodiments, the merchant 102 may request the payment processing system 112 for an extension of the payment deferral within the duration of the pre-qualified payment deferral. The payment processing module 120 resumes withholding a portion of POS transactions for repayment of the cash advance and the fees associated with the cash advance after the duration of the payment deferral.

Figure 4:
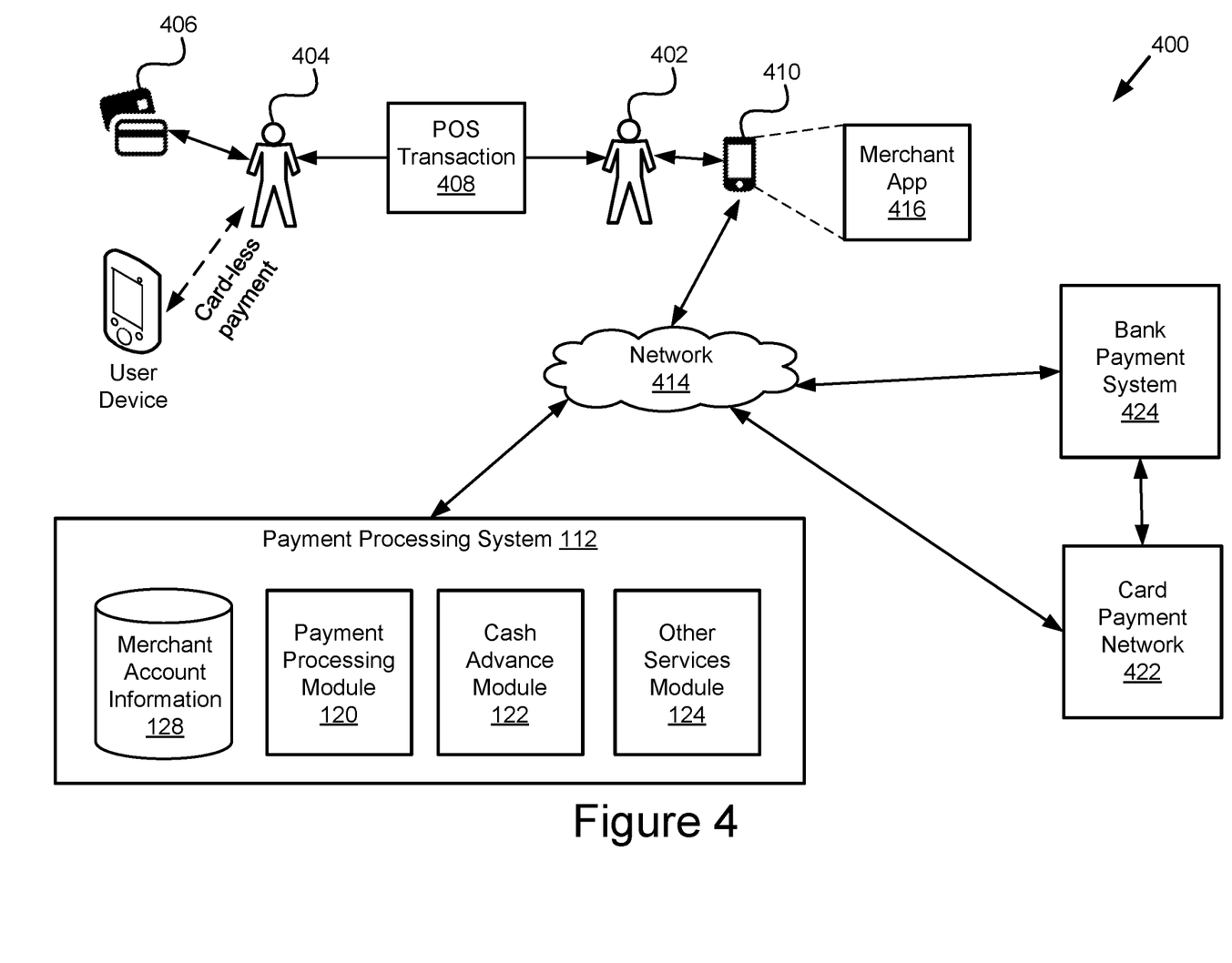
FIG. 4 illustrates an example architecture of a payment processing system environment.

FIG. 4 illustrates an example architecture of a payment processing system 400 for enabling transactions between merchants 402 and buyers 404. In the example of FIG. 4, a buyer 404 may use any of a variety of payment cards 406 when participating in a POS transaction 408 with a merchant 402. For example, a buyer 404 may typically have payment cards 406 such as credit cards, debit cards, prepaid cards, and the like, that the buyer 404 may use for conducting POS transaction 408. In some embodiments, the payment cards 406 may include one or more magnetic stripes for providing payment card and buyer information when swiped in a card reader. In other embodiments, other types of payment cards may be used, for example smart cards having a built-in integrated circuit including a memory chip, a radio frequency identification tag, and the like.

The payment processing system 400 in the example of FIG. 4 illustrates a merchant device 410 associated with the merchant 402 that participates in the payment service provided by the service provider of the payment processing system 112. As discussed elsewhere herein, the merchant device 410 may be a computing device (e.g., a mobile computing device) able to communicate with the payment processing system 112, and with various other computing devices, through any suitable communication protocols, interfaces, and networks, including network 414. Further, the merchant device 410 may be any appropriate device operable to send and receive requests, messages, or other types of information over the network 414. Additionally, while only a single merchant device 410 is illustrated in the example of FIG. 4, there may be additional merchant devices depending on the number of merchants participating in the payment service.

Each merchant device 410 may include an instance of a merchant application 416 executed on the merchant device.

The merchant application 416 may provide POS functionality to enable the merchant 402 to accept payments at a POS location using the merchant device 410. In some types of businesses, the POS location may correspond to a store or other place of business of the merchant 402, and thus, may be a fixed location that typically does not change on a day-to-day basis. In other types of businesses, however, the POS location may change from time to time, such as in the case that the merchant 402 operates a food truck, is a street vendor, a cab driver, or has an otherwise mobile business, e.g., in the case of merchants who sell items at buyers' homes, buyers' places of business, and so forth.

Accordingly, the merchant 402 and the buyer 404 may conduct a POS transaction 408 by which the buyer 404 acquires an item or service from the merchant 402 at a POS location. The merchant application 416 on the merchant device 410 may send transaction information to the payment processing system 412, for example, as the transaction is being conducted at the POS location. In some embodiments, such as if a particular merchant device 410 is not connected to the network 414 and is therefore processing transactions offline, the transaction information may be sent in a batch at a subsequent point in time or using other suitable techniques. In some embodiments, the transaction information may be sent via SMS, MMS, or a voice call over network 414 or various other networks.

The transaction information may include information regarding the time, place, and the amount of each respective transaction, information related to the item acquired, payment card information, as well as additional information, such as buyer information. For instance, the transaction information can include data stored in the payment card, e.g., magnetic stripe or integrated circuit data (cardholder name, card number, and other card information). In addition, when completing the transaction, a buyer may sometimes provide a receipt email address for receiving a receipt through email. Other examples of transaction information that can be captured include detailed item information, e.g., an itemized listing of the items or services being acquired, the price being paid for each item or service, descriptors of the items or services (e.g., size, flavor, color, etc.), geolocation data indicating a geographic POS location of a particular transaction, online/offline card data, data describing the merchant, e.g., a merchant identifier, a merchant category code (MCC), any type of data that is received upon a buyer's authentication into a social network, if any, and various other types of information.

To accept electronic payments for POS transactions, the merchant 402 typically creates a merchant account on the payment processor system 412 by providing information describing the merchant including, for example, merchant name, contact information (e.g., telephone numbers, the merchant's address, and one or more financial accounts to which funds collected from buyers will be deposited). This merchant information can be securely stored by the service provider, for example, as merchant account information 128 in a secure database. Further, the merchant information may include a merchant profile created for each merchant. The merchant profile may include information about the merchant 402 and transaction information associated with transactions conducted by the merchant.

The payment processing system 112 enables a payment service provider to provide a payment service in which merchants 402 are able to conduct POS transactions 408 with a plurality of buyers 404, such as for selling services and/or products to the buyers 404. The payment processing system 112 may include one or more servers that are configured to process secure electronic financial transactions, for example, payment during a POS transaction 408, by communicating with the merchant device 410, card payment networks 422, and bank or other financial institution payment systems 424. The payment processor system 412 includes a payment processing module 120 that receives transaction information for processing payments made through the merchant application 416. For example, the payment processing module 120 may receive transaction information, such as an amount of the transaction, and may verify that a particular payment card 406 can be used to pay for the transaction, such as by contacting a card clearinghouse of a card payment network 422. Furthermore, in some examples, the payment processing module 120 may redirect payment information for transactions to be made using payment cards 406 to a bank payment system 424, or a payment system for some other financial institution. In other embodiments, the merchant device 410 may communicate directly with an appropriate card payment network 422 or bank payment system 424 for approving or denying a transaction using a particular payment card 406 for a POS transaction 408.

As introduced above, the payment processing system 112 may be configured to communicate with one or more systems of a card payment network 422 (e.g., MasterCard®, VISA®, or the like) over the network 414 to conduct financial transactions electronically. The payment processing system 112 may also communicate with one or more bank payment systems 424 of one or more banks, or other financial institutions, over the network 414. For example, the payment processing system 112 may communicate with an acquiring bank, a payment card issuing bank, and/or a bank maintaining buyer accounts for electronic payments.

A payment card acquiring bank may be a registered member of a card association (e.g., Visa®, MasterCard®, or the like), and may be part of a card payment network 422. A payment card issuing bank may issue payment cards 406 to buyers 404, and may pay acquiring banks for purchases made by cardholders to which the issuing bank has issued a payment card 406. Accordingly, in some embodiments, the systems of an acquiring bank may be included in the card payment network 422 and may communicate with systems of a payment card issuing bank to obtain payment. Further, in some embodiments, bank payment systems 424 may include systems associated with debit card issuing institutions, in which case, the systems of the debit card issuing institution may receive communications regarding a transaction in which the buyer uses a debit card instead of a credit card. Additionally, there may be systems of other financial institutions involved in some types of transactions or in alternative system architectures, and thus, the foregoing are merely several examples.

The payment processing system 112 includes a cash advance module 122, other services 124, and a merchant account information database 128 for determining a payment deferral for merchants as described elsewhere herein.

The network 414 can be a conventional type, wired or wireless, and may have numerous different configurations including a star configuration, token ring configuration, or other configurations. Furthermore, the network 414 may include a local area network (LAN), a wide area network (WAN) (e.g., the internet), and/or other interconnected data paths across which multiple devices may communicate. In some embodiments, the network 514 may be a peer-to-peer network. The network 414 may also be coupled with or include portions of a telecommunications network for sending data using a variety of different communication protocols. In some embodiments, the network 414 may include Bluetooth (or Bluetooth low energy) communication networks or a cellular communications network for sending and receiving data including via short messaging service (SMS), multimedia messaging service (MMS), hypertext transfer protocol (HTTP), direct data connection, WAP, email, etc. Although the example of FIG. 4 illustrates one network 414 coupled to the merchant device, payment processor system, card payment network, and bank, in practice one or more networks 414 can connect these entities.

Figure 5:
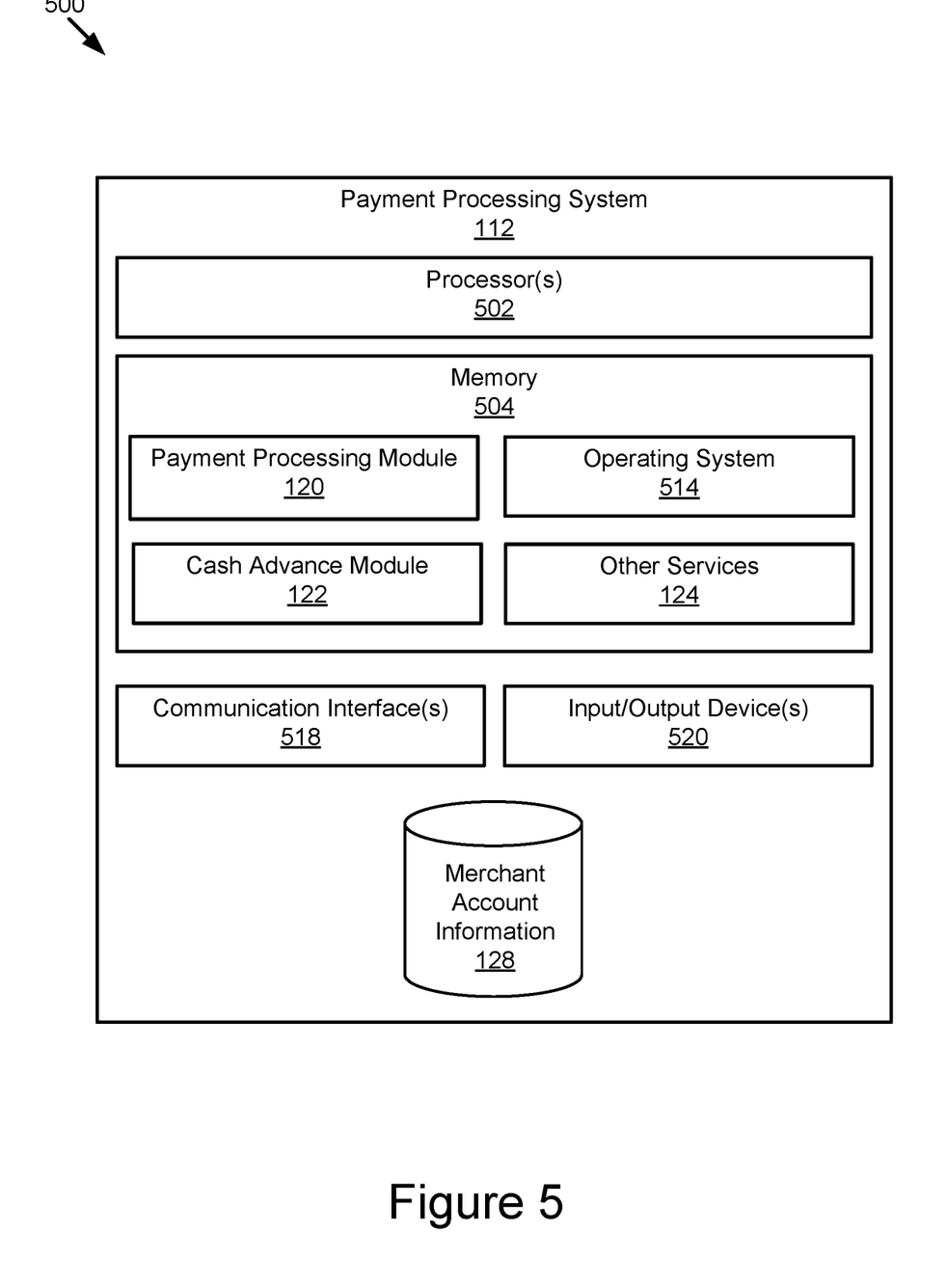
FIG. 5 is a block diagram illustrating select components of an example payment processing system according to some embodiments.

FIG. 5 is a block diagram illustrating select components of an example payment processing system 112 according to some embodiments. The payment processing system 112 may be any suitable type of computing device capable of sending communications and performing the functions according to the techniques described herein and may be operated by a service provider that provides the payment service. For instance, in the case of a server providing the payment processing system 112, the modules, other functional components, and data may be implemented on a single server, a cluster of servers, a server farm or data center, a cloud-hosted computing service, a cloud-hosted storage service, and so forth, although other computer architectures may additionally or alternatively be used.

Further, while the examples herein illustrate the components and data of the payment processing system 112 as being present in a single location, these components and data may alternatively be distributed across different computing devices and different locations. Consequently, the functions may be implemented by one or more computing devices, with the various functionality described above distributed in various ways across the different computing devices, to collectively implement the payment processing system 112. Multiple payment processing systems 112 may be located together or separately, and organized, for example, as virtual servers, server banks and/or server farms. The described functionality may be provided by the servers of a single entity or enterprise, or may be provided by the servers and/or services of multiple different buyers or enterprises.

In the example of FIG. 5, the payment processing system 112 includes one or more processors 502, one or more memory devices 504, one or more communication interfaces 518, and one or more input/output devices 520. Additionally, the payment processing system 112 may include data stores, such as merchant account information 128. These components may be similar to those described above with reference to FIG. 4 and elsewhere herein.

The memory 504 may be used to store and maintain any number of functional components or modules that are executable by the processor 502. In some embodiments, these functional components comprise instructions or programs that are executable by the processor 502 and that, when executed, implement operational logic for performing the actions and services attributed above to the payment processing system 112. Functional components of the payment processing system 112 stored in the memory 504 may include the payment processing module 120, cash advance module 122, and other services 124. These components may be similar to those describe above with reference to FIG. 4 and elsewhere herein. Additional functional components may include an operating system 514 for controlling and managing various functions of the payment processing system 112 and for enabling basic user interactions with the payment processing system 112. In addition, the memory 504 may store data used for performing the operations described herein. Further, the payment processing system 112 may include many other logical, programmatic and physical components, of which those described above are merely examples that are related to the discussion herein.

Figure 6:
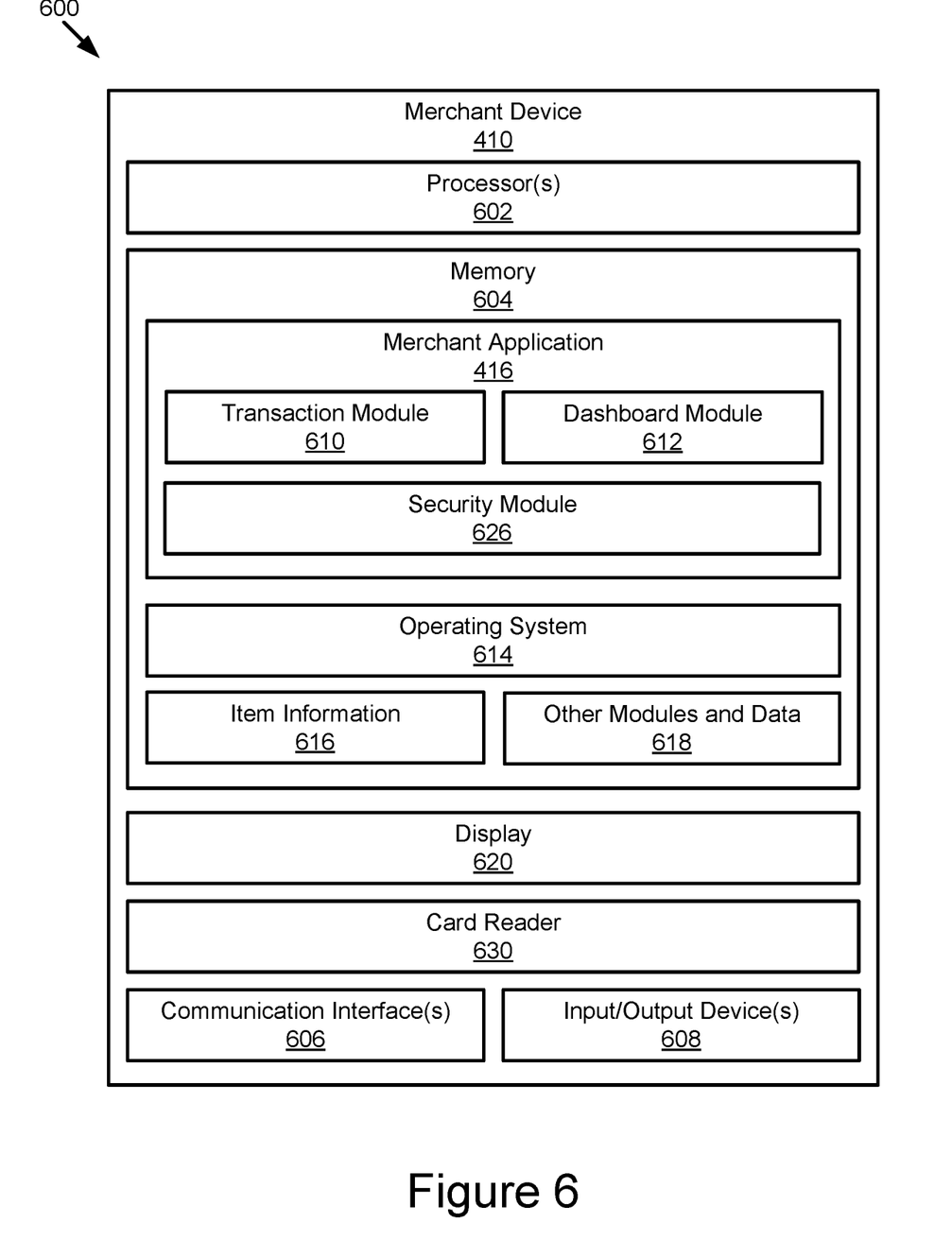
FIG. 6 is a block diagram illustrating select components of an example merchant device according to some embodiments.

FIG. 6 is a block diagram illustrating select components of an example merchant device 410 according to some embodiments. The merchant device 410 may be any suitable type of computing device, for example, portable, semi-portable, semi-stationary, or stationary. Some examples of the merchant device 410 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body mounted computing devices; augmented reality devices; or other computing devices capable of sending communications and performing the functions according to the techniques described herein.

In the example of FIG. 6, the merchant device 410 includes at least one processor 602, a memory 604, one or more communication interfaces 606, and one or more input/output (I/O) devices 608. Each processor 602 may itself comprise one or more processors or processing cores. For example, the processor 602 can be implemented as one or more microprocessors, microcomputers, microcontrollers, digital signal processors, central processing units, state machines, logic circuitries, and/or any devices that manipulate signals based on operational instructions. In some embodiments, the processor 602 may be one or more hardware processors and/or logic circuits of any suitable type specifically programmed or configured to execute the algorithms and processes described herein by performing various input/output, logical, and/or mathematical operations. The processor 602 can be configured to fetch and execute computer-readable processor-executable instructions stored in the memory 604.

Depending on the configuration of the merchant device 410, the memory 604 may be an example of tangible, non-transitory computer storage media and may include volatile and nonvolatile memory and/or removable and non-removable media implemented in any type of technology for storage of information such as computer-readable processor-executable instructions, data structures, program modules or other data. The memory 604 may include, but is not limited to, RAM, ROM, EEPROM, flash memory, solid-state storage, magnetic disk storage, optical storage, and/or other computer-readable media technology. Further, in some cases, the merchant device 410 may access external storage, such as RAID storage systems, storage arrays, network attached storage, storage area networks, cloud storage, or any other medium that can be used to store information and that can be accessed by the processor 602 directly or through another computing device or network. Accordingly, the memory 604 may be computer storage media able to store instructions, modules or components that may be executed by the processor 602.

The memory 604 may be used to store and maintain any number of functional components or modules that are executable by the processor 602. In some embodiments, these functional components comprise instructions or programs that are executable by the processor 602 and that, when executed, implement operational logic for performing the actions and services attributed above to the merchant device 410. Functional components of the merchant device 410 stored in the memory 604 may include the merchant application 416. In this example, the merchant application 416 includes a transaction module 610, a dashboard module 612, and a security module 626. The transaction module 610, for example, presents an interface, such as a payment interface to enable the merchant to conduct transactions, receive payments, and so forth, as well as for communicating with the payment processing system 112 for processing payments and sending transaction information. The dashboard module 612 enables the merchant to manage the merchant's account, the merchant profile, merchant preferences, view saved or new pricing information, receive notification of and accept/reject cash advance payment deferrals, and the like. The security module 626 may, as described herein, enable the merchant application 416 to encrypt and decrypt transaction information communicated between the merchant device 410 and other system components. Additional functional components may include an operating system 614 for controlling and managing various functions of the merchant device 410 and for enabling basic user interactions with the merchant device 410.

In addition, the memory 604 may also store data, data structures and the like, that are used by the functional components. For example, data stored by the memory 604 may include item information 616 that includes information about the items offered by the merchant, which may include a list of items currently available from the merchant, images of the items, descriptions of the items, prices of the items, and so forth. For instance, when the merchant 402 is setting up the merchant application 416 to accept payments for particular items offered by the merchant 402, the merchant may enter the item information 616 for the particular items. Depending on the type of the merchant device 410, the memory 604 may also optionally include other functional components and data, such as other modules and data 618, which may include programs, drivers, etc., and the data used or generated by the functional components. Further, the merchant device 410 may include many other logical, programmatic and physical components, of which those described are merely examples that are related to the discussion herein.

The communication interface(s) 606 may include one or more interfaces and hardware components for enabling communication with various other devices, such as over the network(s) 414 or directly. For example, communication interface(s) 606 may enable communication through one or more of the internet, cable networks, wireless networks (e.g., Wi-Fi) and wired networks, as well as close-range communications such as Bluetooth®, Bluetooth® low energy, and the like, as additionally enumerated elsewhere herein.

In another embodiment, the communication interface(s) 606 may include a cellular communications transceiver for sending and receiving data over a cellular communications network such as via voice call, short messaging service (SMS), multimedia messaging service (MMS), hypertext transfer protocol (HTTP), direct data connection, WAP, e-mail or another suitable type of electronic communication. The communication interface(s) 606 also provides other conventional connections to the network 414 for distribution of files and/or media objects using standard network protocols such as TCP/IP, HTTP, HTTPS and SMTP as will be understood.

The merchant device 410 may further include a display 620, which may employ any suitable display technology. For example, the display 620 may be a liquid crystal display, a plasma display, a light emitting diode display, an OLED (organic light-emitting diode) display, an electronic paper display, or any other suitable type of display able to present digital content thereon. In some embodiments, the display 620 may have a touch sensor associated with the display 620 to provide a touchscreen display configured to receive touch inputs for enabling interaction with a graphical user interface presented on the display 620. Accordingly, embodiments described herein are not limited to any particular display technology.

The merchant device 410 may further include one or more I/O devices 608. The I/O devices 608 may include speakers, a microphone, a camera, and various user controls (e.g., buttons, a joystick, a keyboard, a keypad, etc.), a haptic output device, and so forth.

In addition, the merchant device 410 may include or may be connectable to a payment card reader 630. In some embodiments, the payment card reader 630 may plug in to a port in the merchant device, such as a microphone/headphone port. In other embodiments, the mobile device interface may include other physical connectors, standardized or proprietary, for coupling the payment card reader 630 with the merchant device 410. In yet other embodiments, the payment card reader 630 may use a low power wireless communication interface (e.g., Bluetooth, Bluetooth Low Energy, Zigbee, or the like) to communicatively couple the payment card reader 630 with the merchant device 410 without a physical connection. The payment card reader 630 may include a card interface for reading a magnetic stripe or an integrated circuit of a payment card 406, and further may include encryption hardware and/or logic for encrypting the information read from the payment card 406. Alternatively, numerous other types of payment card readers 630 may be employed with the merchant devices 410 herein, depending on the type and configuration of the merchant device 410.

As used here, the term "payment card" refers to a payment mechanism which includes a debit card, a conventional credit card, "smartcards" that have embedded integrated circuit chips (e.g., Europay-MasterCard-Visa (EMV) cards), or any wallet-size card which functions as a combination of any of these payment mechanisms. In some embodiments, payment card may also include a virtual payment card stored on a device such as a smart phone or other device and transmittable, for example, via near field communication or other suitable means.

Other components included in the merchant device 410 may include various types of sensors (not shown), which may include a GPS device, an accelerometer, gyroscope, compass, proximity sensor, and the like. Additionally, the merchant device 410 may include various other components that are not shown, examples of which include removable storage, a power source, such as a battery and power control unit, and so forth.

A payment communication system using a payment card reader has been described. In the above description, for purposes of explanation, numerous specific details are set forth in order to provide a thorough understanding of the techniques introduced herein. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the techniques may be implemented using any type of computing system that can receive data and commands, and present information as part of any peripheral device providing services.

Reference in the specification to "one embodiment" or "an embodiment" means that a particular feature, structure, or characteristic described in connection with the embodiment is included in at least one embodiment of the description. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiment, an entirely software embodiment or an embodiment containing both hardware and software elements. In one embodiment, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments has been presented for the purposes of illustration and description. It is not intended to be exhaustive or to limit the techniques to the precise form disclosed. Many modifications and variations are possible in light of the above teaching. It is intended that the scope of the embodiments be limited not by this detailed description, but rather by the claims of this application. As will be understood by those familiar with the art, the examples described herein may be embodied in other specific forms without departing from the spirit or essential characteristics thereof. Likewise, the particular naming and division of the modules, routines, features, attributes, methodologies and other aspects are not mandatory or significant, and the mechanisms that implement the techniques or features may have different names, divisions and/or formats. Furthermore, as will be apparent to one of ordinary skill in the relevant art, the modules, routines, features, attributes, methodologies and other aspects of the techniques can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, known to those of ordinary skill in the art of computer programming. Additionally, the techniques are in no way limited to implementation in any specific programming language, or for any specific operating system or environment. Accordingly, the specification is intended to be illustrative, but not limiting, of the scope of the claims, which are set forth below.

What is claimed is:
1. A computer-implemented method comprising:
  receiving, by a financial system, from a plurality of computing devices associated with a plurality of users, respectively, transaction data of transactions performed by the plurality of users;
  providing, by the financial system, based at least on the transaction data, financing to an account of a user of the plurality of users, the financing including repayment terms for repayment of the financing;
determining, by the financial system, and based at least in part on a signal determined by an analytics service that indicates a change in an amount of income of the user, updated repayment terms for repayment of the financing by the user, wherein the analytics service determines the change based at least on one or more signals received by the analytics service from one or more other services of the user; and
applying, by the financial system, the updated repayment terms for repayment of the financing.

2. The computer-implemented method as recited in claim 1, wherein the one or more signals received by the analytics service from the one or more other services of the user include one or more signals received from at least one of: an invoicing service; an inventory service; a payroll service; an appointment service; a feedback service; a pickup service; or a delivery service.

3. The computer-implemented method as recited in claim 2, wherein the user is a merchant, and the change in the amount of income of the user is related to a change in sales of the user.

4. The computer-implemented method as recited in claim 2, wherein the one or more signals received by the analytics service from the one or more other services of the user are indicative of at least one state of a business of the user.

5. The computer-implemented method as recited in claim 4, wherein the analytics service is configured to determine a condition of the business based on analysis of information about the business and the one or more signals received from the one or more other services of the user.

6. The computer-implemented method as recited in claim 1, wherein determining, based at least in part on the signal received from the analytics service, the updated repayment terms further comprises:
retrieving, by the financial system, from the transaction data, account information for the user and account information for a plurality of other users determined by the financial system to be similar to the user; and
determining, by the financial system, based on the account information for the user and the account information for the plurality of other users, that the user is expected to have a change in a condition of a business of the user for an upcoming time period.

7. The computer-implemented method as recited in claim 1, further comprising:
sending a notification of the updated repayment terms to a computing device associated with the user to cause, at least in part, the computing device to present a user interface including the updated repayment terms; and
receiving, via the user interface, an indication of acceptance of the updated repayment terms.

8. A non-transitory computer-readable medium storing instructions executable by one or more processors of a financial system to cause the one or more processors to perform operations comprising:
receiving, by the one or more processors, from a plurality of computing devices associated with a plurality of users, respectively, transaction data of transactions performed by the plurality of users;
providing, by the one or more processors, based at least on the transaction data, financing to an account of a user of the plurality of users, the financing including repayment terms for repayment of the financing;
determining, by the one or more processors, and based at least in part on a signal determined by an analytics service that indicates a change in an amount of income of the user, updated repayment terms for repayment of the financing by the user, wherein the analytics service determines the change based at least on one or more signals received by the analytics service from one or more other services of the user; and
applying, by the one or more processors, the updated repayment terms for repayment of the financing.

9. The non-transitory computer-readable medium as recited in claim 8, wherein the one or more signals received by the analytics service from the one or more other services of the user include one or more signals received from at least one of: an invoicing service; an inventory service; a payroll service; an appointment service; a feedback service; a pickup service; or a delivery service.

10. The non-transitory computer-readable medium as recited in claim 9, wherein the user is a merchant, and the change in the amount of income of the user is related to a change in sales of the user.

11. The non-transitory computer-readable medium as recited in claim 9, wherein the one or more signals received by the analytics service from the one or more other services of the user are indicative of at least one state of a business of the user.

12. The non-transitory computer-readable medium as recited in claim 11, wherein the analytics service is configured to determine a condition of the business based on analysis of information about the business and the one or more signals received from the one or more other services of the user.

13. The non-transitory computer-readable medium as recited in claim 8, wherein determining, based at least at least in part on the signal received from the analytics service, the updated repayment terms further comprises operations of:
retrieving, by the one or more processors of the financial system, from the transaction data, account information for the user and account information for a plurality of other users determined by the financial system to be similar to the user; and
determining, by the one or more processors of the financial system, based on the account information for the user and the account information for the plurality of other users, that the user is expected to have a change in a condition of a business of the user for an upcoming time period.

14. A system comprising:
one or more processors of a financial system, the one or more processors configured by executable instructions to perform operations comprising:
receiving, by the one or more processors, from a plurality of computing devices associated with a plurality of users, respectively, transaction data of transactions performed by the plurality of users;
providing, by the one or more processors, based at least on the transaction data, financing to an account of a user of the plurality of users, the financing including repayment terms for repayment of the financing;
determining, by the one or more processors, and based at least in part on a signal determined by an analytics service that indicates a change in an amount of income of the user, updated repayment terms for repayment of the financing by the user, wherein the analytics service determines the change based at least on one or more signals received by the analytics service from one or more other services of the user; and applying, by the one or more processors, the updated repayment terms for repayment of the financing.

15. The system as recited in claim 14, wherein the one or more signals received by the analytics service from the one or more other services of the user include one or more signals received from at least one of: an invoicing service; an inventory service; a payroll service; an appointment service; a feedback service; a pickup service; or a delivery service.

16. The system as recited in claim 15, wherein the user is a merchant, and the change in the amount of income of the user is related to a change in sales of the user.

17. The system as recited in claim 15, wherein the one or more signals received by the analytics service from the one or more other services of the user are indicative of at least one state of a business of the user.

18. The system as recited in claim 17, wherein the analytics service is configured to determine a condition of the business based on analysis of information about the business and the one or more signals received from the one or more other services of the user.

19. The system as recited in claim 14, wherein determining, based at least in part on the signal received from the analytics service, the updated repayment terms further comprises operations of:
retrieving, by the financial system, from the transaction data, account information for the user and account information for a plurality of other users determined by the financial system to be similar to the user; and
determining, by the financial system, based on the account information for the user and the account information for the plurality of other users, that the user is expected to have a change in a condition of business of the user for an upcoming time period.

20. The system as recited in claim 14, the operations further comprising:
sending a notification of the updated repayment terms to a computing device associated with the user to cause, at least in part, the computing device to present a user interface including the updated repayment terms; and
receiving, via the user interface, an indication of acceptance of the updated repayment terms.

\* \* \* \* \*